(12) United States Patent
Zhou et al.

(10) Patent No.: US 11,272,188 B2
(45) Date of Patent: Mar. 8, 2022

(54) COMPRESSION FOR DEEP NEURAL NETWORK

(71) Applicant: NEXTVPU (SHANGHAI) CO., LTD., Shanghai (CN)

(72) Inventors: Ji Zhou, Shanghai (CN); Xinpeng Feng, Shanghai (CN)

(73) Assignee: NEXTVPU (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 17/191,606

(22) Filed: Mar. 3, 2021

(65) Prior Publication Data
US 2021/0266565 A1 Aug. 26, 2021

Related U.S. Application Data

(63) Continuation of application No. PCT/CN2020/089696, filed on May 12, 2020.

(30) Foreign Application Priority Data

May 24, 2019 (CN) .......................... 201910441306.3

(51) Int. Cl.
*H04N 7/18* (2006.01)
*H04N 19/159* (2014.01)
(Continued)

(52) U.S. Cl.
CPC ............. *H04N 19/159* (2014.11); *G06N 3/08* (2013.01); *G06N 5/04* (2013.01); *H04N 19/90* (2014.11)

(58) Field of Classification Search
CPC .... H04N 19/159; H04N 19/90; H04N 19/124; H04N 19/42; G06N 3/08; G06N 5/04; G06N 3/082; G06N 3/084; G06N 3/0454
(Continued)

(56) References Cited

U.S. PATENT DOCUMENTS 10,229,356 B1 3/2019 Liu et al.
2018/0082181 A1 3/2018 Brothers et al.
(Continued)

FOREIGN PATENT DOCUMENTS

CN 1784015 A 6/2006
CN 107092961 A 8/2017
(Continued)

OTHER PUBLICATIONS

Chen, Yushi, "Hyperspectral Data Dimensionality Reduction and Compression Technology", Section: 6.1.2 Preservation of ROI in hyperspectral data compression, Nov. 2014, p. 96.
(Continued)

*Primary Examiner* — Shan E Elahi
(74) *Attorney, Agent, or Firm* — Seed IP Law Group LLP (57) ABSTRACT

Disclosed is a compression method for a deep neural network. The deep neural network comprises a plurality of layers. The method includes the following steps for each of at least one layer of the plurality of layers other than an input layer: reading parameters of that layer from a parameter storage space; reading a first feature map stored by an immediate previous layer from a feature map storage space; generating a second feature map on the basis of the read parameters and the first feature map; compressing the second feature map so as to obtain a third feature map; and storing the third feature map into the feature map storage space. Further, a chip based on the compression method and a medium are also provided.

20 Claims, 5 Drawing Sheets

(51) Int. Cl.
*H04N 19/90* (2014.01)
*G06N 3/08* (2006.01)
*G06N 5/04* (2006.01)

(58) Field of Classification Search
USPC .................................................. 375/240.12
See application file for complete search history.

(56) References Cited

U.S. PATENT DOCUMENTS

| | | | |
|---|---|---|---|
| 2018/0139458 A1* | 5/2018 | Wang | H04N 19/17 |
| 2018/0189981 A1 | 7/2018 | Singh et al. | |
| 2018/0249158 A1* | 8/2018 | Huang | H04N 19/82 |
| 2018/0307987 A1* | 10/2018 | Bleiweiss | G06N 3/105 |
| 2018/0350110 A1 | 12/2018 | Cho et al. | |
| 2019/0025773 A1* | 1/2019 | Yang | G06N 3/0454 |
| 2019/0132591 A1* | 5/2019 | Zhang | H04N 19/136 |
| 2020/0193609 A1* | 6/2020 | Dharur | G06T 7/11 |

FOREIGN PATENT DOCUMENTS

| | | |
|---|---|---|
| CN | 109376856 A | 2/2019 |
| CN | 109389218 A | 2/2019 |
| CN | 109523017 A | 3/2019 |
| CN | 109726799 A | 5/2019 |
| CN | 109766995 A | 5/2019 |
| CN | 110163370 A | 8/2019 |
| KR | 20170128080 A | 11/2017 |
| KR | 20180075368 A | 7/2018 |
| KR | 20180101055 A | 9/2018 |
| KR | 20190023546 A | 3/2019 |
| KR | 20190043930 A | 4/2019 |
| WO | 2018214913 | 11/2018 |
| WO | 2019050771 A1 | 3/2019 |

OTHER PUBLICATIONS

Chengchen, Du, "The Research on Image Compression Coding Algorithm Based on EBCOT", Chongqing University of Posts and Telecommunication, Mar. 2017, http://gb.oversea.cnki.net/KCMS/detail/detail.aspx?filename=1017700629.nh&dbcode=CMFD&dbname=CMFDREF <https://protect-us.mimecast.com/s/whG1C73W11fAEALRiNIreH?domain=gb.oversea.cnki.net>.

Feng, Dachun, "Common Image Compression Standards", University Information Technology Foundation, Section: 7.5.2, Jan. 2017, p. 188-189.

He, Kun, "Research on Quality Scalable Coding Under H.264", Area bit reduction experiment based on H.264 standard, Section 3.3, Apr. 2007, pp. 30-35.

Li, Ying, "Research on Multi-Image Fusion Algorithm and Application", Multi-Image Fusion Algorithm Based on Block DCT Transform Coding, Section: 2.1.2 Adaptive quantization, Nov. 2015, pp. 11-14.

Mo et al., "New Computer Technology", University Computer, Section: 7.1.8, Aug. 2018, p. 253.

Zhao, et al., "Medical Signal and Image Analysis", Handbook of Medical Statistics (China Statistics Press), Section: 24.10 Image Digitization, 2017, p. 497 https://www.worldscientific.com/worldscibooks/10.1142/10259#t=toc <https://protect-us.mimecast.com/s/21QZC68zkkCrVrXWHmrpU3?domain=worldscientific.com>.

Nomizu, Yasuyuki, "JPEG 2000 Latest Trends", Dec. 25, 2000, 11 pages.

Meddeb, Marwa et al., "Region-Of-Interest Based Rate Control Scheme for High Efficiency Video Coding", 2014 IEEE International Conference on Acoustic, Speech and Signal Processing (ICASSP), May 4, 2014, pp. 7338-7342.

Struharik, Rastislav et al., "CoNNA—Compressed CNN Hardware Accelerator", 2018 21st Euromicro Conference on Digital System Design, IEEE, Aug. 29, 2018, pp. 365-372.

* cited by examiner

COMPRESSION FOR DEEP NEURAL NETWORK

CROSS-REFERENCE TO RELATED APPLICATION

This disclosure is a continuation application of International Application No. PCT/CN2020/089696, filed on May 12, 2020, which claims priority to Chinese Patent Application No. 201910441306.3, filed on May 24, 2019. For various purposes, the entire content of the aforementioned application is incorporated herein by reference.

BACKGROUND

Technical Field

The present disclosure relates to neural networks, and more specifically, to compression for deep neural networks.

Description of the Related Art

A deep neural network (DNN) is the core of artificial intelligence technologies. Currently, the deep neural network has gained extensive research and attention, and is applied in many fields of artificial intelligence applications including computer vision, speech recognition, robots, automated driving, etc.

The deep neural network is composed of a plurality of neural network layers, including an input layer, a number of hidden layers (also referred to as intermediate layers), and an output layer. The current deep neural network usually has a very large number of layers, even up to thousands of layers, and each layer includes a large number of nodes. Therefore, the entire deep neural network may include millions or even tens of millions of parameters, which require very large storage space and memory bandwidth. This not only increases the storage costs, but also affects the performance of the deep neural network. Especially for real-time applications such as video surveillance and automated driving, the storage issue of the deep neural network is becoming a bottleneck in its performance and hardware design.

BRIEF SUMMARY

According to an aspect of the present disclosure, a compression method for a deep neural network is provided. The deep neural network includes a plurality of layers. The method includes, for each of at least one layer in the plurality of layers except an input layer: reading parameters of the layer from a parameter storage space; reading a first feature map stored by an immediate previous layer from a feature map storage space; generating a second feature map based on the read parameters and the first feature map; compressing the second feature map to obtain a third feature map; and storing the third feature map in the feature map storage space.

According to an aspect of the present disclosure, a chip is provided, including: a memory and a deep neural network engine. The memory includes a parameter storage space and a feature map storage space, wherein the parameter storage space is configured for storing parameters of a deep neural network, and the feature map storage space is configured for storing a feature map of the deep neural network. The deep neural network engine is configured to cooperate with the memory to perform a method according to the present disclosure.

According to an aspect of the present disclosure, a non-transitory computer-readable storage medium that stores a program is provided. The program includes instructions that, when executed by a processor, cause the processor to perform a method according to the present disclosure.

BRIEF DESCRIPTION OF THE SEVERAL VIEWS OF THE DRAWINGS

The drawings exemplarily show embodiments and form a part of the specification, and are used to explain example implementations of the embodiments together with a written description of the specification. The embodiments shown are merely for illustrative purposes and do not limit the scope of the claims. Throughout the drawings, the same reference numerals refer to the same elements.

DETAILED DESCRIPTION

In the present disclosure, unless otherwise stated, the terms "first", "second", etc., used to describe various elements are not intended to limit the positional, temporal or importance relationship of these elements, but rather only to distinguish one component from another. In some examples, the first element and the second element may refer to the same instance of the element, and in some cases, based on contextual descriptions, the first element and the second element may also refer to different instances.

The terms used in the description of the various examples in the present disclosure are merely for the purpose of describing particular examples, and are not intended to be limiting. If the number of elements is not specifically defined, there may be one or more elements, unless otherwise expressly indicated in the context. Moreover, the term "and/or" used in the present disclosure encompasses any of and all possible combinations of listed items.

Figure 1:
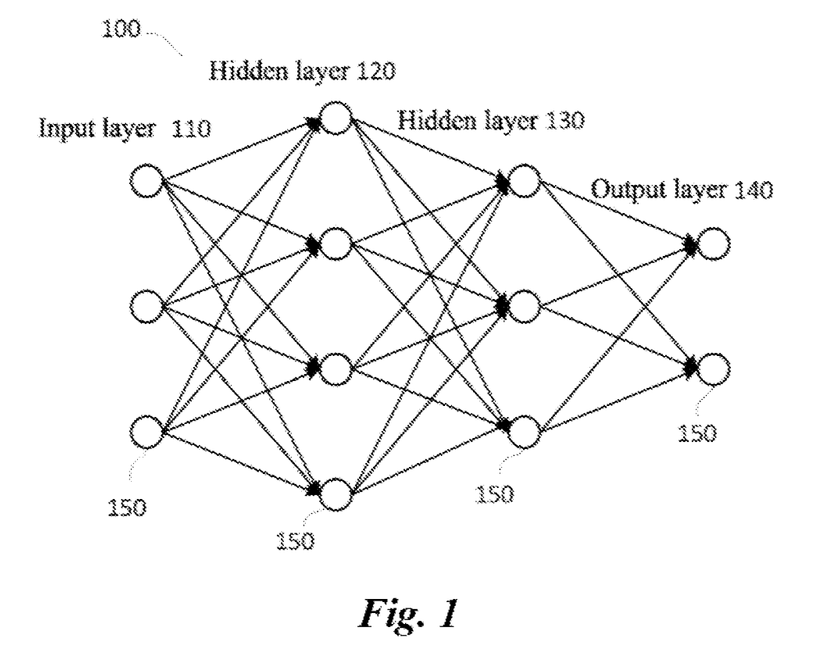
FIG. 1 is a schematic diagram showing a deep neural network according to an example embodiment of the present disclosure.

FIG. 1 is a schematic diagram showing an example deep neural network. The deep neural network is a neural network that includes at least one hidden layer in addition to an input layer and an output layer. As an example, the deep neural network 100 shown in FIG. 1 includes an input layer 110, two hidden layers 120 and 130, and an output layer 140. Each layer includes several nodes (also referred to as neurons) 150. As an example, the input layer 110 of FIG. 1 has three nodes, the hidden layer 120 has four nodes, the hidden layer 130 has three nodes, and the output layer 140 has two nodes. It should be noted that FIG. 1 is only a simple example of a deep neural network, and the number of hidden layers of an actual deep neural network and the number of nodes in each layer can be much greater than these numbers.

The input layer 110 receives input data, such as a pixel of a picture, an amplitude sample of audio, a digital representation of a system status, etc. The data is propagated to the hidden layer 120. Each node in the hidden layer 120 computes the received data and propagates a computation result to the next hidden layer 130. Similarly, each node in the hidden layer 130 computes the received data and propagates a computation result to the output layer 140. The output layer 140 processes the received data and outputs a result, for example, a recognition result of a specific object.

Nodes between layers may be fully connected or partially connected. In the fully connected case, any node in a current layer (for example, the output layer 140) is connected to all nodes of an immediate previous layer (for example, the hidden layer 130). In the partially connected case, one or more nodes in a current layer (for example, the output layer 140) may be connected to only some but not all nodes in an immediate previous layer (for example, the hidden layer 130). In the neural network shown in FIG. 1, all layers are fully connected. However, it can be understood that at least some layers in the deep neural network may be partially connected.

According to an embodiment, each node in the hidden layers 120 and 130 and the output layer 140 performs linear or non-linear operations on input data. Assuming that a node 150 is located in the hidden layer 130, and the node 150 has four inputs $x_1$, $x_2$, $x_3$, and $x_4$, and has an output y, $$y = f(\Sigma_{i=1}^{4} w_i x_i + b) \qquad \text{formula (1)}$$

where $w_i$ is a weight of an input $x_i$ of the node 150 (i=1, 2, 3, 4; and in some neural networks, a weight is also referred as a connection, that is, a connection from each node in the hidden layer 120 to the node 150 in the hidden layer 130 is used to represent a corresponding weight), b is a bias of the node 150, and function f( ) is an activation function of the node 150, which may be a non-linear function, such as a sigmoid function, a hyperbolic tangent (tanh) function, a rectified linear unit (ReLU) function, or a leaky ReLU function. It can be understood that neither the bias b nor the activation function f( ) is necessary, and some nodes may have only a weight w.

In a neural network, the weight w and the bias b used in the computation of each node can be obtained through continuous learning in a training process, and are usually referred to as parameters of the neural network.

Since the number of layers and nodes of a deep neural network is usually very large, the number of parameters required for training and inference is huge. For example, assuming that input data is a color image with a size of 100×100 pixels, since each pixel has three color values R, G, and B, the input layer will have 3×10⁴ nodes, and each node represents a color value of one pixel. Assuming that the first hidden layer of the neural network has 1000 nodes and is fully connected to the input layer, the number of parameters (weight w and bias b) required by computation of the first hidden layer is 3×10'+1000. As the number of layers increases, the number of parameters increases accordingly. Since in an inference process or a training process of a neural network, each layer needs to read corresponding parameters from and/or store corresponding parameters into a memory (such as a memory of a graphics processor, which may be various random access memories or volatile memories, such as a DRAM, an SRAM, a DDR RAM or other random access solid-state memories), this imposes great pressure on the storage capacity and memory bandwidth of the memory.

A common deep neural network is a convolutional neural network, and its hidden layer includes at least one convolutional layer. Compared with a conventional deep neural network, a convolutional neural network can output better results in image and speech recognition and other aspects, and can reduce the number of parameters required by the network. The most common application of the convolutional neural network is image recognition. In the following discussion, as an example, input data is an image. However, those skilled in the art should understand that the application of the convolutional neural network is not limited to image recognition.

Figure 2:
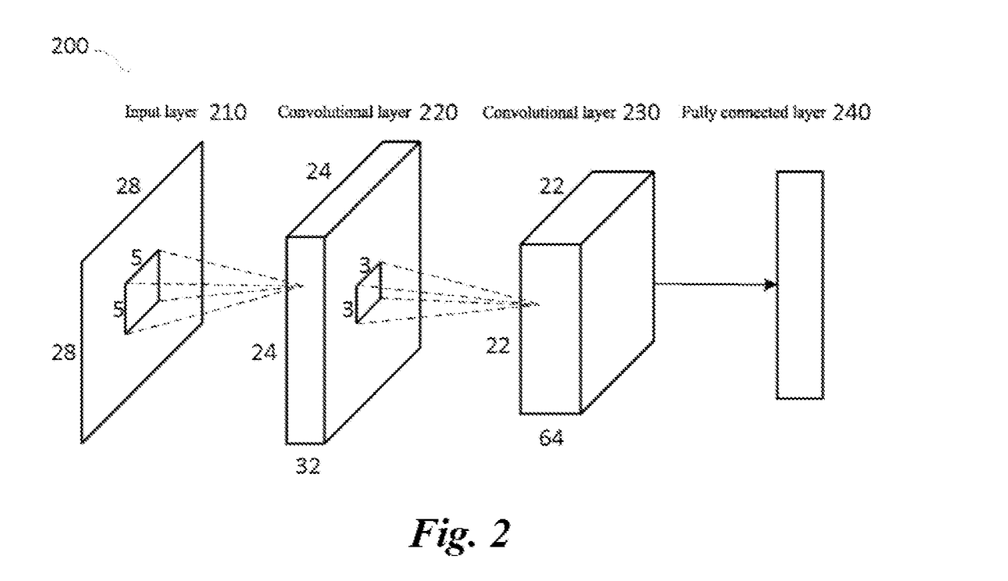
FIG. 2 is a schematic diagram showing a convolutional neural network (CNN) according to an example embodiment of the present disclosure.

In a typical convolutional neural network, after an input image passes a series of convolutional layers, an optional pooling layer, and a fully connected layer, a corresponding recognition result can be output. FIG. 2 is a schematic diagram showing an example convolutional neural network. It should be noted that the convolutional neural network has many forms, FIG. 2 is only a simple example representation, and the solution of the present disclosure is not limited thereto.

As shown in FIG. 2, the convolutional neural network 200 may include an input layer 210. The input layer 210 may be used to receive input data, such as an image. According to an embodiment, the input layer 210 may perform preprocessing, for example, de-meaning, normalization, decorrelation, whitening, etc., on the data, to facilitate subsequent processing. As an example, an input image in FIG. 2 is a grayscale image of 28×28 pixels, that is, the size of the input image is 28×28×1. Each pixel may be equivalent to one node in the input layer 110 in FIG. 1. If a color image is input, since the color image has three color channels: R, G, and B, the size of the color image will be 28×28×3.

The convolutional neural network 200 shown in FIG. 2 further includes two convolutional layers 220 and 230. Each of the convolutional layers 220 and 230 can use one or more convolution kernels, also referred to as filters, to perform feature extraction on the input image. Each convolution kernel is a weight matrix, which is convolved with image data input to the convolutional layer to extract a feature of the image. Different convolution kernels may extract different image features, such as a vertical edge, a horizontal edge, a curve, color, or other low-level features, or eyes, a nose, a hat, or other high-level features, which usually depends on positions of the convolution kernels in the convolutional layer. An output of such a convolution operation may be referred to as a feature map. For the input layer 210, its feature map is the input image. It should be noted that the "feature map" mentioned herein is neither limited to data extracted based on the image, nor limited to the input and output data of a convolutional layer in the convolutional neural network. All input and output data of layers in various deep neural networks can be considered as feature maps.

The convolutional layer 220 has 32 convolution kernels, and the size of each convolution kernel is 5×5×1. This is for the case where the input image is a grayscale image (with a depth of 1). If the image of the input layer 210 is a color image, a depth of each convolution kernel of the convolutional layer 220 is 3, that is, the size of the convolution kernel is 5×5×3. For three-dimensional "3D" images, the size of the convolutional kernel is further increased to include the ranging information of at least some of the pixels on the 3D image. As described above, the convolution kernel is a weight matrix, which may be convolved with the input image to obtain an output feature map corresponding to the convolution kernel. According to an embodiment, for the convolutional layer 220, a dot product of a 5×5 convolution kernel and a 5×5 pixel block in the input image may be performed to obtain a feature value. Such a dot product means that each weight in the convolution kernel is multiplied by a pixel at a corresponding position and then a summation is performed. In addition, a bias (if any) may be added. A position of the 5×5 pixel block in the input image is changed sequentially, assuming a step is 1, for example, from left to right, and then from top to bottom, and a dot product of a 5×5 pixel block at each position and one and the same convolution kernel is performed, such that a feature map composed of 24×24 feature values can be obtained, that is, an output feature map of the convolution kernel. In the case of a color image, the depth of the input image and the depth of the convolution kernel are both 3. After each layer of the convolution kernel is convolved with a corresponding layer of the input image, an output feature map of the convolution kernel can be obtained by performing an arithmetic summation on the three convolution results thereof. For each convolution kernel, a feature map with a size of 24×24 can be generated. Since the convolutional layer 220 has 32 convolution kernels, a total of 32 feature maps with a size of 24×24 are generated, or one feature map with a size of 24×24×32 is generated.

Similarly, the convolutional layer 230 has 64 convolution kernels, and the size of each convolution kernel is 3×3×32. Each convolution kernel is convolved with a feature map output by the convolutional layer 220 to generate a 22×22 feature map. Therefore, the convolutional layer 230 generates a total of 64 feature maps with a size of 22×22, or one feature map with a size of 22×22×64 is generated.

The convolutional neural network 200 may also include a fully connected layer 240 as an output layer, which may be similar to the output layer 140 in FIG. 1, and will not be repeated here. Although only one fully connected layer is shown in FIG. 2, those skilled in the art should understand that there may be a plurality of fully connected layers, and each fully connected layer may have a different number of nodes.

It should be understood that FIG. 2 is only a simple illustration of a convolutional neural network. In an actual convolutional neural network, the number of convolutional layers is usually greater. Operations performed by using the convolution kernel are not limited to a dot product, but can be more complex, such as various filtering operations commonly used in digital signal processing, for example, performed by using a Gaussian filter, a Laplacian filter, etc. Each convolutional layer may also include an activation function, which may be similar to the activation function JO described above with reference to FIG. 1. For each feature map, a zero padding operation can also be performed on the periphery of the feature map to make the two-dimensional size of the output feature map consistent with the input feature map. In addition, there may also be an optional pooling layer (not shown) between the convolutional layers, and the pooling layer uses the principle of image local correlation to downsample the feature map output by a convolutional layer to reduce a computation amount of subsequent layers.

The parameters of the convolutional neural network are mainly the weights and possible biases in the convolutional layers and the fully connected layer. Similar to parameters in a common deep neural network, these parameters are continuously optimized through training until a trained convolutional neural network is obtained. Since different pixel blocks in the convolutional layer of the convolutional neural network can share the same convolution kernel, and the size of the convolution kernel is much less than the size of the feature map (usually referred to as parameter sharing and local perception), compared with a conventional deep neural network, the convolutional neural networks can effectively reduce the number of parameters of a neural network. However, due to the large number of layers of the convolutional neural network and the number of convolution kernels in each layer, the parameters of the convolutional neural network will still occupy a large storage capacity and memory bandwidth.

Currently, there have been some researches intended to solve or alleviate the storage issue of a deep neural network.

One idea is to use a memory with a larger bandwidth, such as a high bandwidth memory (HBM). However, the costs of this manner are high, and the hardware design is also very difficult.

Another idea is to compress a deep neural network. One compression method is to change the scale of the neural network. For example, by reducing the number of layers of the neural network or the number of convolution kernels, or removing unimportant connections in the neural network, the neural network can be trimmed; or the idea of matrix or tensor decomposition is used to reconstruct an original network parameter matrix or parameter tensor with a small number of parameters to reduce network storage overheads. Another compression method is to compress neural network parameters themselves. For example, low-bit quantization can be performed on network parameters, such as using 8-bit or 16-bit integer numbers instead of 64-bit floating-point numbers to reduce storage and computation overheads. Alternatively or additionally, lossless compression may be performed on the parameters, for example, using Huffman coding for compression. However, the compression ratio of lossless compression is low, for example, does not exceed 2:1, and the effect thereof is not that stable.

It can be learned that most of the current compression methods for a deep neural network focus on the compression of neural network parameters. However, the inventors have noticed that in addition to the parameters of the neural network, the access of the feature map also occupies a large storage capacity and memory bandwidth. For example, in the inference and training process of the deep neural network, feature maps generated by each layer need to be stored in a memory (such as various random access memories or volatile memories, such as a DRAM, an SRAM, a DDR RAM or other random access solid-state memories) for a next layer to read and use. In the case of a large amount of input data (for example, the resolution of the input image is high), the access of the feature map will also consume a large amount of storage space and memory bandwidth, and even more memory resources than the access of the parameters. This is a huge challenge for the application of a neural network, especially the real-time application of the neural network.

To this end, the present disclosure proposes a new compression method for a deep neural network, which is more suitable for the real-time application of a large amount of data of a neural network than the existing neural network compression technologies.

Figure 3:
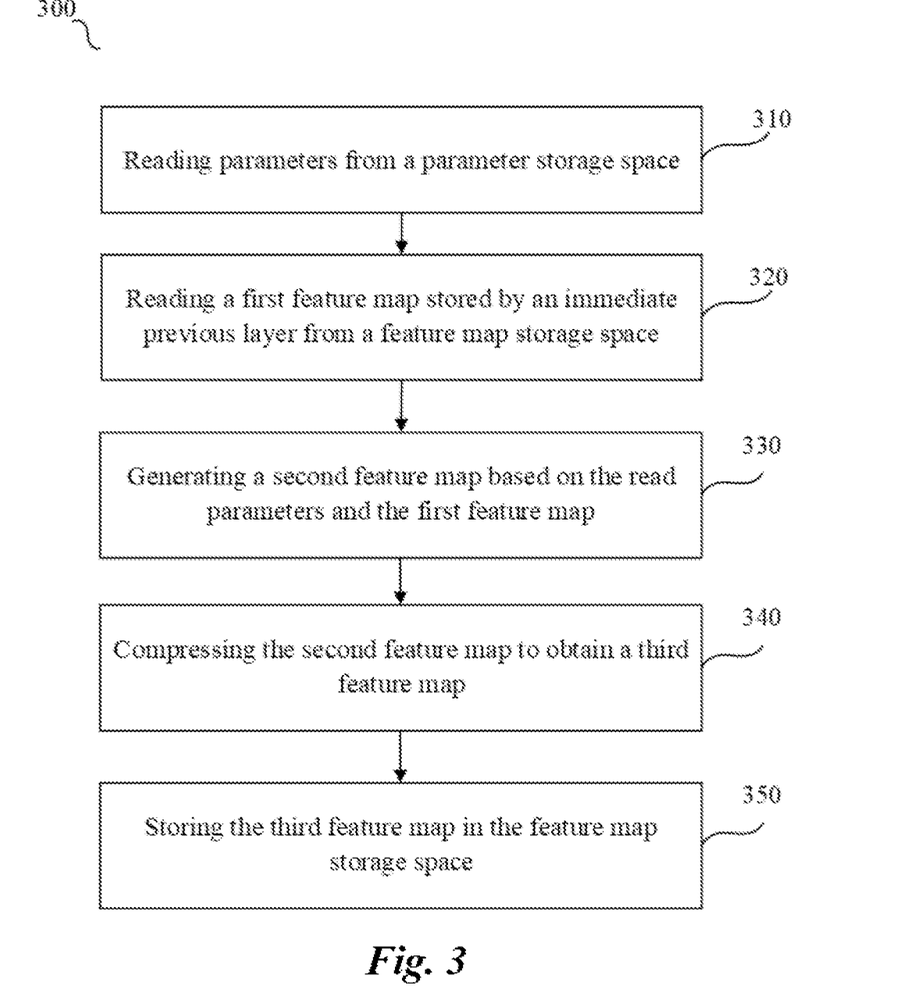
FIG. 3 is a flowchart showing an example compression method for a deep neural network according to an example embodiment of the present disclosure.

FIG. 3 is a flowchart showing an example compression method 300 for a deep neural network according to an example embodiment of the present disclosure. The method 300 can be performed for any layer of the deep neural network except an input layer. For the convenience of description, an $i^{th}$ layer is taken as an example for description.

In block 310, the $i^{th}$ layer reads parameters required by the layer for computation from a parameter storage space. The parameters may be any parameters in the deep neural network, such as the weight w and the bias b used by each node described in conjunction with FIG. 1, or the weight and the bias of each convolution kernel described in conjunction with FIG. 2.

According to an embodiment, the parameters read from the parameter storage space in block 310 may be compressed parameters. A parameter compression manner may be, for example, lossless compression (for example, Huffman coding) or lossy compression.

In block 320, the $i^{th}$ layer reads a first feature map stored by an $(i-1)^{th}$ layer from a feature map storage space. The first feature map can be data output by any layer of the neural network. For example, the first feature map may be data output by the input layer 110, the hidden layer 120, or the hidden layer 130 in FIG. 1, or data output by the input layer 210, the convolutional layer 220, and the convolutional layer 230 in FIG. 2, or data output by the pooling layer, the fully connected layer, etc.

According to an embodiment, the first feature map may be a compressed feature map. According to an embodiment, the feature map generated by the $(i-1)^{th}$ layer can be compressed and stored in the feature map storage space, so that the first feature map read by the $i^{th}$ layer is a compressed feature map. According to an embodiment, the first feature map may alternatively or additionally be an uncompressed feature map. For example, the feature map generated by the $(i-1)^{th}$ layer is not compressed, but is directly stored in the feature map storage space.

In block 330, the $i^{th}$ layer generates a second feature map based on the read parameters and the first feature map. According to an embodiment, if the read parameters are compressed parameters, the parameters can be decompressed and then used in the computation in the $i^{th}$ layer. According to an embodiment, if the read first feature map is a compressed feature map, the first feature map can be decompressed and then used in the computation in the $i^{th}$ layer. For an example of generating, by the $i^{th}$ layer, the second feature map based on the feature map of the $(i-1)^{th}$ layer and the corresponding parameters, reference can be made to the description made in conjunction with FIG. 1, in which each node 150 can use formula (1) to generate an output of the node, and after outputs of all nodes in each layer is summarized, a feature map generated by the layer can be obtained. For an example of generating, by the $i^{th}$ layer, the second feature map based on the feature map of the $(i-1)^{th}$ layer and the corresponding parameters, reference can be made to the description made in conjunction with FIG. 2, in which a convolution kernel of each layer can be convolved with a feature map of an immediate previous layer to generate a feature map corresponding to the convolution kernel. If the layer has a plurality of convolution kernels, a plurality of feature maps can be generated, or the plurality of feature maps can be combined into a high-dimensional feature map. It can be understood that these are only examples of generating a feature map, and the implementation of generating the second feature map in block 330 is not limited thereto.

In block 340, the $i^{th}$ layer compresses the second feature map generated in block 330 to obtain a third feature map. The compression of the second feature map may be lossless compression, or may be lossy compression, which will be described in more detail below.

According to an embodiment, said compressing the second feature map may include: compressing different regions of the second feature map in different compression ratios, wherein a compression ratio of each of the regions depends on a degree of interest in the region. In one example, a compression ratio of a region of a high degree of interest (for example, the first degree of interest) is less than a compression ratio of a region of a low degree of interest (for example, a second degree of interest that is less than the first degree of interest). For example, when an object processed by the neural network is an image or a video, for a region of interest in the image (that is, a region of a high degree of interest, such as a portrait), it is usually expected that an image obtained after compression and decompression of the region has a high similarity with an original image, and for this reason, a small compression ratio can be used to reduce information loss; and for a region that is not of interest in the image (that is, a region of a low degree of interest, such as the sky), a requirement for a similarity between an image obtained after compression and decompression of the region and the original image can be reduced, and for this reason, a large compression ratio can be used. Similarity measurement parameters may be, for example, an Euclidean distance, a peak signal-to-noise ratio (PSNR), a structural similarity evaluation (SSIM), etc.

In block 350, the $i^{th}$ layer stores the third feature map obtained in block 340 in the feature map storage space. The parameter storage space and the feature map storage space may be located in separate memories, or may share the same memory. As an example, memories used for the parameter storage space and the feature map storage space may be a high-speed random access memory, such as a DRAM, an SRAM, a DDR RAM, or other random access solid-state memories.

The method 300 can be applied to both the inference process of the deep neural network and the training process of the deep neural network. This will be described in more detail later in conjunction with FIGS. 5 and 6.

By using the method 300, a feature map generated by at least one layer of the deep neural network is compressed and then stored, which can significantly reduce the storage space required for the feature map and the memory bandwidth occupied by the same. This is particularly useful for the real-time application of the neural network. For example, in the application scenario of video surveillance, if a neural network is used to recognize an object in a video image in real time, a large number of video frames need to be processed in real time. If the video data has a high resolution (for example, higher than 300×300 pixels, or even higher), this will bring a huge challenge to the memory bandwidth. By compressing the feature map before storing the same, the memory bandwidth occupied when the feature map is stored in and read from the memory can be greatly reduced, which is helpful to realize the real-time application of the neural network. In addition, since the read compressed feature map is decompressed for computation (for example, convolution), the method 300 has little impact on the accuracy of inference of the neural network. The method 300 can also be combined with the compression of neural network parameters and corresponding hardware design to further accelerate the operation of the neural network and reduce the power consumption of the memory.

The method 300 is applicable to any deep neural network. For the convolutional neural network, the method 300 may be performed for at least one convolutional layer. According to an embodiment, the method 300 may alternatively or additionally be performed for the pooling layer and the fully connected layer. For the convolutional neural network, the method 300 may be performed for all convolutional layers, or the method 300 may be performed selectively for some convolutional layers. According to an embodiment, a feature map generated by a convolutional layer close to an input side is larger than a feature map generated by a convolutional layer close to an output side, and occupies more storage space and memory bandwidth. Therefore, the method 300 can be applied to one or more convolutional layers close to the input side.

It should be noted that, unless logically necessary, the order of the steps in the method 300 is not limited to the order shown or described, but can be adjusted or performed in parallel as required, and the operations in different steps can be performed in parallel or in an interleaved manner. The present disclosure does not impose any limitations on this. For example, block 310 and block 320 may be performed in a reverse order or in parallel, without affecting the implementation of the present disclosure.

The following takes video data as an input to the neural network as an example to describe compression of a feature map in more detail. The compression of the feature map can be applied to any layer of the neural network, such as the $(i-1)^{th}$ layer, the $i^{th}$ layer, or all layers described in conjunction with FIG. 3.

Figure 4:
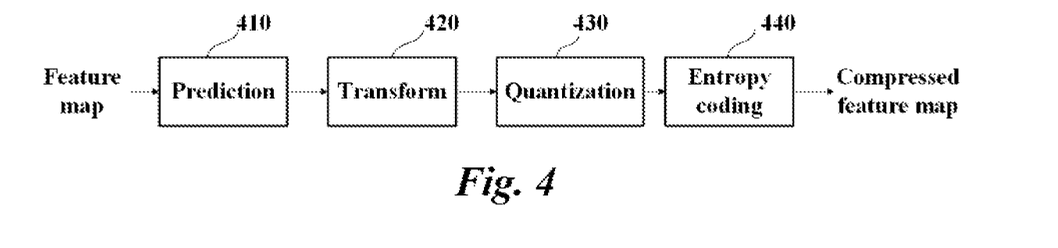
FIG. 4 is a schematic block diagram showing compressing a feature map according to an example embodiment of the present disclosure.

FIG. 4 is a schematic block diagram showing compressing a feature map according to an example embodiment of the present disclosure. As shown in FIG. 4, operations such as prediction (block 410), transform (block 420), quantization (block 430), and entropy coding (block 440) can be performed on the feature map generated by the layers in the neural network to remove spatial redundancy, temporal redundancy, and coding redundancy in the feature map. These operations in FIG. 4 will be described one by one below. However, it can be understood that not all the operations in FIG. 4 are necessary for the present disclosure, and one or more of blocks 410 to 440 can be used to compress the feature map as required. For example, if lossless compression is performed on the feature map, quantization 430 may not be performed on the feature map, or only entropy coding 440 is performed on the feature map. For another example, the compression of the feature map may include only transform 420, quantization 430, and entropy coding 440, and prediction 410 may not be performed.

In block 410, predictive coding is performed on the input feature map. Predictive coding may include one or both of intra prediction and inter prediction. Intra-frame coding can be used to eliminate spatial redundancy, and inter-frame coding can be used to eliminate temporal redundancy. The feature map can be divided into a plurality of blocks, and coding is performed per block. As an example, various predictive coding techniques adopted in video standards such as MPEG, H.264, and H.265 can be used for predictive coding of the feature map in block 410.

In block 420, the feature map is transformed from a spatial domain to a frequency domain, so as to effectively remove the correlation between signals and concentrate most of the energy in a low-frequency region. Based on the result of the transform, a signal in a high-frequency region can be discarded in a subsequent quantization step, or a smaller quantization step for the low-frequency region and a larger quantization step for the high-frequency region can be used to maintain high image quality while achieving a large compression ratio. As an example, various transform technologies such as discrete Fourier transform (DFT), discrete sine transform (DST), K-L transform, wavelet transform, etc., may be used to transform the feature map.

In block 430, a transform coefficient obtained in block 420 is quantized. In quantization, a small number of quantization values can be used to approximately represent a large number of transform coefficients. Since there is a difference between an original transform coefficient and a reconstructed transform coefficient, that is, distortion, the feature map compression that uses quantization is lossy compression. Compared with the lossless compression, the lossy compression has more choices of algorithms and more adjustable compression parameters, and can adapt to different requirements by controlling the compression ratio. According to the embodiments of the present disclosure, the use of the lossy compression can achieve a larger compression ratio while having little impact on the accuracy of the inference of the neural network. For example, according to an embodiment, when the compression ratio of the lossy compression is greater than 10:1, the inference accuracy of the neural network is reduced by less than 5%. In addition, in the training process, performing lossy compression on a feature map of a layer can be equivalent to adding a disturbance to parameters and the feature map of the layer, which can prevent the training from falling into a local minimum, and thus can improve the inference capability of the neural network.

In block 440, entropy coding is performed on a quantization result of block 430 to remove statistical redundancy information that still exists after prediction and transform. As an example, the entropy coding may use variable-length coding (VLC) (for example, Huffman coding, exponential Golomb code (EGC), etc.) or arithmetic coding.

The process of compression of the feature map is briefly described above in conjunction with FIG. 4. Those skilled in the art can understand that these descriptions are merely example descriptions rather than limitations on the present disclosure. In specific implementation, the feature map can be compressed by using various known video compression methods, such as compression methods based on MPEG, H.264, H.265, and other video standards, or various video compression methods that are being developed or will be developed in the future. This is not limited in the present disclosure.

According to an embodiment of the present disclosure, compressing the feature map (for example, compressing the second feature map shown in block 340 of FIG. 3) may include non-uniform quantization of the feature map. According to an embodiment, different quantization steps may be used for different regions of the feature map. Many factors may be considered to determine a quantization step of each region.

According to an embodiment, the quantization step of the region may be determined according to image complexity of the region. For example, a small quantization step is assigned to a region with high image complexity to retain more details, and a large quantization step is assigned to a region with low image complexity. In one example, the image complexity can be measured by a preset threshold. High image complexity may mean that the image complexity is greater than the preset threshold, and low image complexity may mean that the image complexity is less than or equal to the preset threshold.

According to an embodiment, the quantization step of the region may be determined according to a position of the region in the feature map. For example, for the video surveillance application, a region specially monitored by each video camera may have a relatively fixed position in the image, and a feature map region corresponding to the position may be assigned a small quantization step.

According to an embodiment, the quantization step of the region may be determined according to an importance degree of the region. For example, for a video image, importance degrees of regions in the image can be determined in advance, and different quantization steps can be assigned according to the order of the importance degrees during quantization.

According to an embodiment, the quantization step of the region can be determined according to presence or absence of specific features, e.g., target features, in the region. The specific features may depend on the application scenario of the neural network. According to an embodiment, the specific features may be features of interest in the application scenario. For example, for security monitoring, the specific features may be features related to a person or an identity; for traffic monitoring, the specific features may be features related to a vehicle model, a license plate, a traffic light, etc.; for a live broadcast of a football game, the specific features may be features related to a player, a ball, a referee, a goal, etc. In one example, if the specific features exist in the region, a small quantization step (for example, the first quantization step) may be assigned to the region to retain more details; and if the specific features do not exist in the region, a large quantization step (for example, a second quantization step greater than the first quantization step) may be assigned to the region.

According to an embodiment, the quantization step of the region may be determined according to the number of the specific features in the region. In an example, if the number of the specific features in the region is large, for example, greater than a determined threshold, predetermined or dynamically determined, a small quantization step, for example, a third quantization step, may be assigned to the region to retain more details; and if the number of the specific features in the region is small, for example, less than or equal to the determined threshold, a large quantization step, for example, a fourth quantization step greater in step size than the third quantization step, may be assigned to the region. Similar to the previous embodiment, the specific features may depend on the application scenario, which will not be repeated herein.

It can be understood that these factors mentioned above can be considered individually or in combination. This is not limited in the present disclosure. Different quantization steps are assigned to regions in the feature map based on characteristics of the regions, which can not only achieve a high compression ratio, but can also retain as much as possible the details of the feature map that are important to the application, thereby maintaining the inference accuracy of the neural network.

Figure 5:
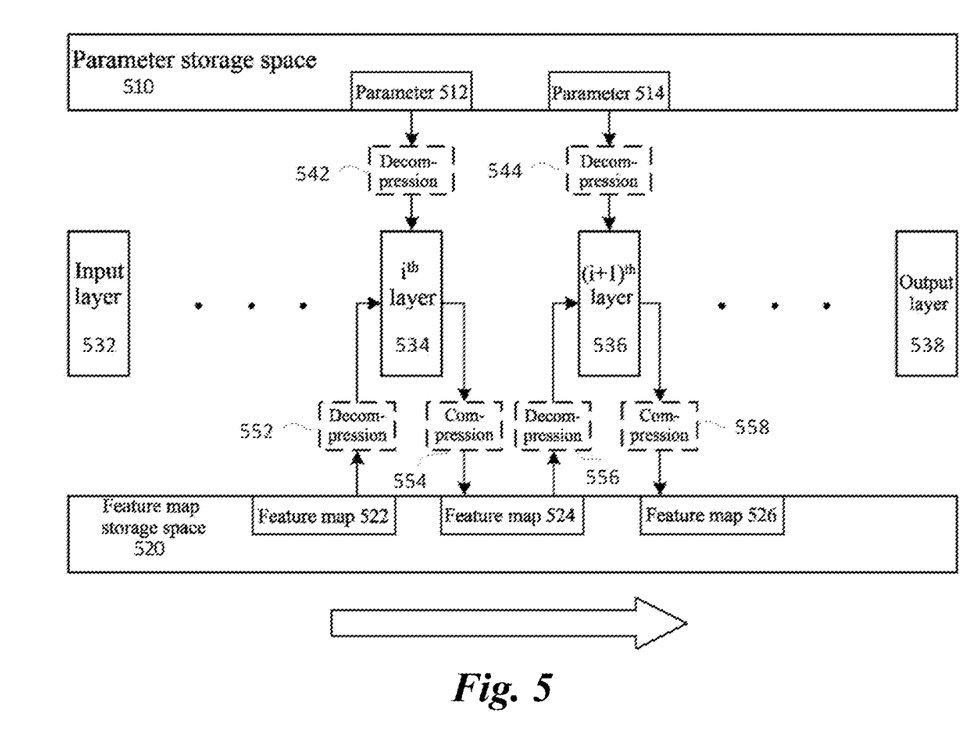
FIG. 5 is a schematic diagram showing an inference process of a deep neural network according to an example embodiment of the present disclosure.
Figure 6:
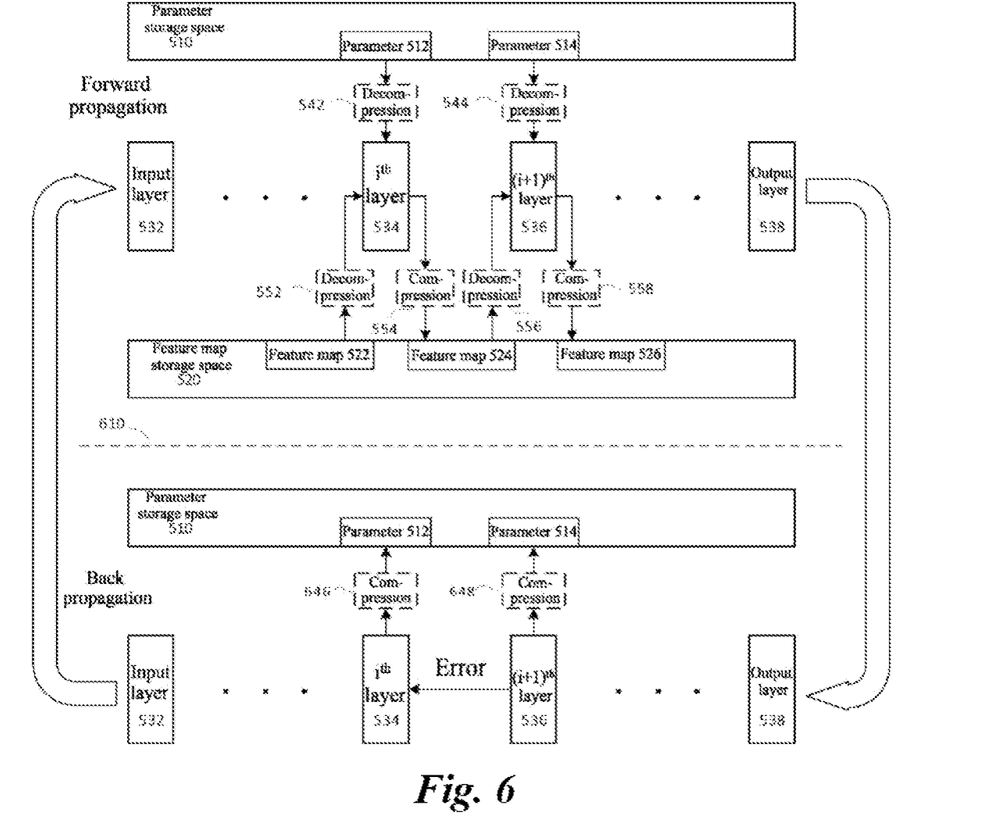
FIG. 6 is a schematic diagram showing a training process of a deep neural network according to an example embodiment of the present disclosure.

The following describes the inference process and the training process of the neural network according to the example embodiment of the present disclosure in conjunction with FIGS. 5 and 6.

FIG. 5 is a schematic diagram of an inference process of a deep neural network according to an example embodiment of the present disclosure. The inference process of the neural network is a process of inputting data to be processed to the trained neural network to obtain an inference result. As shown in FIG. 5, the deep neural network includes an input layer 532, an output layer 538, and a plurality of hidden layers. For simplicity, FIG. 5 shows only two adjacent layers: the $i^{th}$ layer and the $(i+1)^{th}$ layer, which are denoted by reference numerals 534 and 536, respectively. FIG. 5 also shows a parameter storage space 510 and a feature map storage space 520. In the inference process, each layer in the neural network sequentially processes incoming data until the output layer 538 outputs a final inference result. The processing in layers 534 and 536 will be described below as an example.

As shown in FIG. 5, the $i^{th}$ layer 534 reads parameters 512 required by the layer 534 for computation from the parameter storage space 510. According to an embodiment, if the parameters 512 are compressed, the parameters 512 are decompressed in block 542. The layer 534 also reads a feature map 522 stored by an $(i-1)^{th}$ layer from the feature map storage space 520. According to an embodiment, if the feature map 522 is compressed, the feature map 522 is decompressed in block 552. Based on the decompressed versions of the parameters 512 and the feature map 522, a feature map of the layer 534 is generated. After the feature map is compressed (in block 554), the feature map is stored in the feature map storage space 520 as a feature map 524 stored by the layer 534.

Next, the $(i+1)^{th}$ layer 536 performs operations that are similar to those of the $i^{th}$ layer 534. Parameters 514 and the feature map 524 are respectively read from the parameter storage space 510 and the feature map storage space 520 and are decompressed (as shown in blocks 544 and 556). Then, based on the decompressed versions of the parameters 514 and the feature map 524, a feature map of the layer 536 is generated. After the feature map is compressed (in block 558), the feature map is stored in the feature map storage space 520 as a feature map 526 stored by the layer 536 for use by a next layer.

By analogy, subsequent layers in the neural network perform the above operations in sequence until the output layer 538 outputs the final inference result. It should be understood that although FIG. 5 describes the compression and decompression of parameters and a feature map of each layer, as mentioned earlier, such compression and decompression operations can be performed in only some of the layers in the neural network, and alternatively or additionally, compression and decompression operations can be performed on only the feature map instead of the parameters.

FIG. 6 is a schematic diagram of a training process of a deep neural network according to an example embodiment of the present disclosure. The training process of the neural network is a process of training parameters of the neural network based on a known sample set. The training process of the neural network is iterated continuously until an error between the final output result and a target value is less than a determined threshold. Each iteration can be divided into two phases, namely, a forward propagation phase and a back propagation phase. The forward propagation phase is similar to the inference process. For each sample, each layer performs computation in sequence to obtain a final output value. Next, in the back propagation phase, the error between the output value and the target value is first computed. When the error is greater than the determined threshold, the error is transmitted from the output layer to the neural network for back propagation, and errors of layers are computed in sequence, and parameters of the layers are updated according to the computed errors. Based on the updated parameters, a forward propagation phase of a next iteration is started.

In FIG. 6, for clarity, a dashed line 610 is used to separate the forward propagation phase and the back propagation phase. As shown in the upper part of FIG. 6, the forward propagation phase of the training process is the same as that in FIG. 5, and details will not be repeated here. The lower part of FIG. 6 shows the back propagation phase of the training process. In the back propagation phase, the error between the final output value and the target value in the forward propagation phase is transmitted from the output layer 538 to the input layer 532 in sequence. The $(i+1)^{th}$ layer 536 computes the updated parameters 514 based on an error of the layer 536 received from an $(i+2)^{th}$ layer, and stores the same in the parameter storage space 510. According to an embodiment, the updated parameters may be compressed (in block 648) and then stored in the parameter storage space 510. The layer 536 also computes the error of the $i^{th}$ layer 534 and propagates the same back to the layer 534. Similarly, the layer 534 computes the updated parameters 512 based on the received error, and stores the same in the parameter storage space 510. According to an embodiment, the updated parameters may be compressed (in block 646) and then stored in the parameter storage space 510. As shown by the large arrow on the left of FIG. 6, when the back propagation phase ends in the input layer 532, the training process starts a forward propagation phase of a next iteration based on updated parameters of all the layers.

It should be noted that FIGS. 5 and 6 show only an example inference process and training process of the neural network. Those skilled in the art can understand that based on different structures of neural networks, other corresponding inference processes and training processes can be used.

Figure 7:
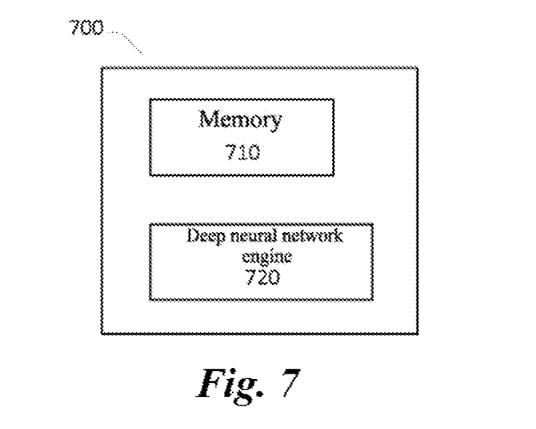
FIG. 7 is a schematic diagram showing a chip according to an example embodiment of the present disclosure.

FIG. 7 is a schematic diagram showing a chip 700 according to an example embodiment of the present disclosure. The chip 700 may include a memory 710 and a deep neural network engine 720.

The memory 710 may include a parameter storage space and a feature map storage space. The parameter storage space is used to store parameters of a deep neural network, and the feature map storage space is used to store a feature map of the deep neural network. According to an embodiment, the memory 710 may be various random access memories or volatile memories, such as a DRAM, an SRAM, a DDR RAM or other random access solid-state memories.

The deep neural network engine 720 may apply the deep neural network to input data such as image data to implement operations such as image detection, recognition, and partitioning. The deep neural network engine 720 may cooperate with the memory 710 to perform the methods in the various embodiments of the present disclosure as described above. According to an embodiment, the deep neural network engine 720 may be implemented by hardware, for example, implemented by an application-specific integrated circuit (ASIC).

It should be understood that various variations may be made to an implementation of the deep neural network engine 720 according to specific requirements. For example, the various variations may be implemented in hardware, software, firmware, middleware, microcode, hardware description languages, or any combination thereof. For example, the deep neural network engine 720 may be implemented by programming hardware (for example, a programmable logic circuit including a field programmable gate array (FPGA) and/or a programmable logic array (PLA)) in an assembly language or a hardware programming language (such as VERILOG, VHDL, and C++) by using the logic and algorithm according to the present disclosure instead of the ASIC.

According to an embodiment, the chip 700 may be an artificial intelligence (AI) vision chip. In addition, although not shown in FIG. 7, the chip 700 may further include other components, such as an image signal processing (ISP) unit configured to process an image signal (such as a signal output by an image sensor); a multimedia signal codec configured to encode and decode audio and video signals, etc.

Figure 8:
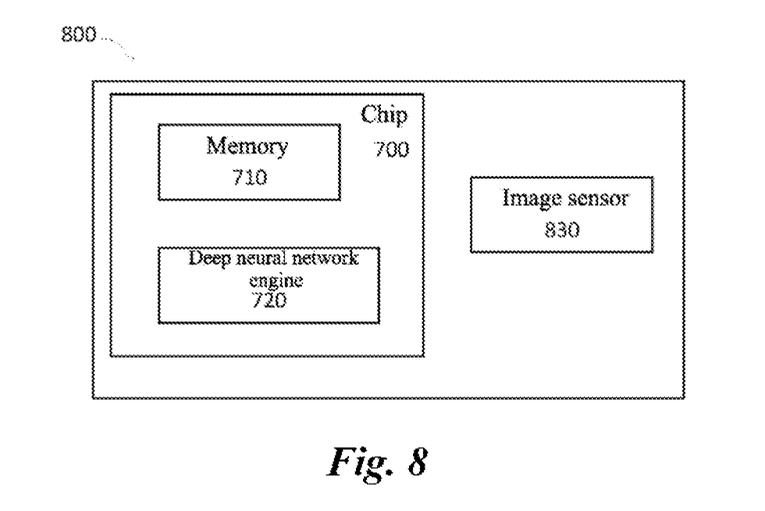
FIG. 8 is a schematic diagram showing an electronic device according to an example embodiment of the present disclosure.

FIG. 8 is a schematic diagram showing an electronic device 800 according to an example embodiment of the present disclosure. The electronic device 800 may include the chip 700 shown in FIG. 7 and an image sensor 830. The image sensor 830 may be configured to capture image and/or video data. According to an embodiment, the electronic device 800 may be a video camera or a camera integrated with an AI vision chip. Such an electronic device 800 can be used in a variety of scenarios, for example, automatic detection and recognition of human faces or other specific objects in security monitoring, real-time detection and recognition of pedestrians, motor vehicles, traffic signs, etc., in automated driving, assistance of a robot in recognizing objects and avoid obstacles, etc.

Figure 9:
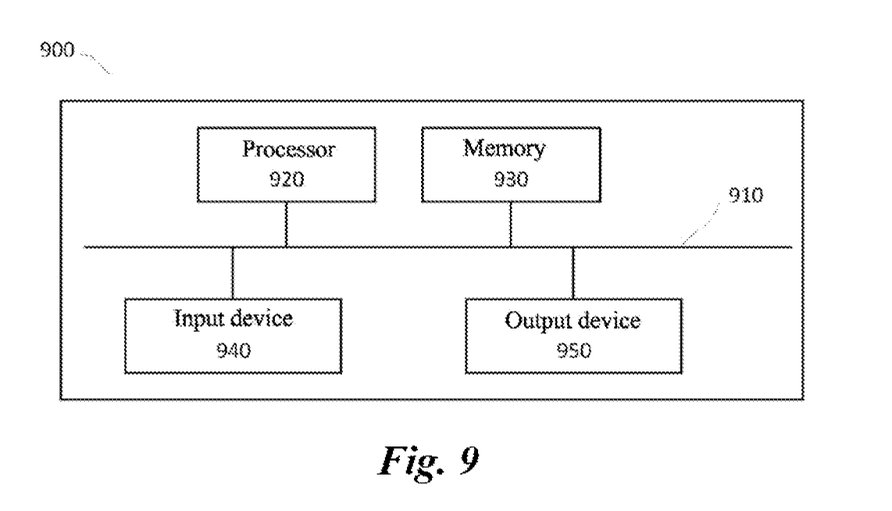
FIG. 9 is a schematic diagram showing an electronic device according to an example embodiment of the present disclosure.

FIG. 9 is a schematic diagram showing an electronic device 900 according to an example embodiment of the present disclosure. The electronic device 900 may be any machine configured to perform processing and/or computation, which may be, but is not limited to, a workstation, a server, a desktop computer, a laptop computer, a tablet computer, a personal digital assistant, a smartphone, an onboard computer, or any combination thereof. The foregoing method according to the embodiments of the present disclosure may be implemented, in whole or at least in part, by the electronic device 900 or a similar device or system.

The electronic device 900 may include a bus 910, one or more processors 920, one or more memories 930, one or more input devices 940, and one or more output devices 950. The one or more processors 920 may be any type of processors, and may include but are not limited to one or more general purpose processors (such as a central processing unit (CPU)) and/or one or more dedicated processors (such as a graphics processing unit (GPU)). The one or more memories 930 may include non-volatile memories (such as disk drives, optical storage devices, solid-state memories, floppy disks, hard disks, magnetic tapes, and read-only memory (ROM)) and/or volatile memories (such as a random access memory (RAM) and a cache memory). The memory 930 may store data and/or programs for implementing the method according to the embodiments of the present disclosure. The data stored in the memory 930 is, for example, data in the parameter storage space and the feature map storage space shown in FIGS. 5 and 6. The programs stored in the memory 930, when executed by the processor 920, may cause the electronic device 900 to perform a method according to the embodiments of the present disclosure.

The input device 940 may be any type of device capable of inputting information to the electronic device 900, and may include, but is not limited to, a sensor (e.g., the image sensor as described above), a mouse, a keyboard, a touchscreen, a microphone and/or a remote controller. The output device 950 may be any type of device capable of outputting information, and may include, but is not limited to, a display, a speaker, a video/audio output terminal, a vibrator, and/or various output interfaces.

It should be understood that one or more components of the electronic device 900 may be distributed on a network. For example, some processing may be executed by one processor while other processing may be executed by another processor away from the one processor. Therefore, the electronic device 900 can be interpreted as a distributed computing system that performs processing at a plurality of positions.

In addition, an aspect of the present disclosure may include a computer-readable storage medium storing a program, the program including instructions that, when executed by a processor, cause the processor to perform any of the foregoing methods.

Embodiments of example methods and products according to some aspects of the present disclosure are listed in the following items:

1. A compression method for a deep neural network, which includes a plurality of layers, wherein the method includes, for each of at least one layer in the plurality of layers except an input layer: reading parameters of the layer from a parameter storage space; reading a first feature map stored by an immediate previous layer from a feature map storage space; generating a second feature map based on the read parameters and the first feature map; compressing the second feature map to obtain a third feature map; and storing the third feature map in the feature map storage space.

2. The method according to item 1, wherein the compression performed on the second feature map includes lossy compression.

3. The method according to item 1, wherein the method is used in a forward propagation phase in a training process of the deep neural network and an inference process of the deep neural network.

4. The method according to item 1, wherein the deep neural network includes a convolutional neural network, and the convolutional neural network includes a plurality of convolutional layers, and wherein the method is performed for at least one of the convolutional layers.

5. The method according to item 1, wherein the first feature map is a compressed feature map, and wherein said generating the second feature map based on the read parameters and the first feature map includes: decompressing the first feature map; and generating the second feature map based on the read parameters and the decompressed first feature map.

6. The method according to item 1, wherein the parameters read from the parameter storage space are compressed parameters, and wherein said generating the second feature map based on the read parameters and the first feature map includes: decompressing the read parameters; and generating the second feature map based on the decompressed parameters and the first feature map.

7. The method according to item 2, wherein said compressing the second feature map includes: transforming the second feature map from a spatial domain into a frequency domain; and quantizing a transform coefficient.

8. The method according to item 2, wherein said compressing the second feature map further includes: performing predictive coding on the second feature map, wherein the predictive coding includes intra prediction and/or inter prediction.

9. The method according to item 2, wherein said compressing the second feature map includes: compressing different regions of the second feature map in different compression ratios, wherein a compression ratio of each of the regions depends on a degree of interest in the region, and wherein a compression ratio of a region of a first degree of interest is less than a compression ratio of a region of a second degree of interest, the first degree of interest being higher than the second degree of interest.

10. The method according to item 2, wherein said compressing the second feature map includes: performing non-uniform quantization on the second feature map, wherein different regions of the second feature map have different quantization steps.

11. The method according to item 10, wherein the quantization step of each of the regions of the second feature map is determined based on at least one of the following: image complexity of the region; a position of the region in the second feature map; an importance degree of the region; presence or absence of specific features in the region; and the number of the specific features in the region.

12. The method according to item 11, wherein the specific features include features of interest in an application scenario of the deep neural network.

13. The method according to item 11, wherein determining the quantization step of each of the regions according to the presence or absence of the specific features in the region includes: in response to the presence of the specific features in the region, assigning a first quantization step to the region; in response to the absence of the specific features in the region, assigning a second quantization step to the region, wherein the first quantization step is less than the second quantization step.

14. The method according to item 11, wherein determining the quantization step of each of the regions according to the number of the specific features in the region includes: in response to the number of the specific features in the region being greater than a preset threshold, assigning a third quantization step to the region; and in response to the number of the specific features in the region being less than or equal to the determined threshold, assigning a fourth quantization step to the region, wherein the third quantization step is less than the fourth quantization step.

15. The method according to item 1, wherein the deep neural network is used for processing image and/or video data for object recognition.

16. A chip, including: a memory including a parameter storage space and a feature map storage space, wherein the parameter storage space is configured for storing parameters of a deep neural network, and the feature map storage space is configured for storing a feature map of the deep neural network; and a deep neural network engine configured to cooperate with the memory to perform a method according to any one of items 1 to 15.

17. The chip according to item 16, wherein the memory includes a random access memory.

18. The chip according to item 16, wherein the chip includes an artificial intelligence vision chip.

19. The chip according to item 18, wherein the chip further includes: an image signal processing (ISP) unit configured to process an image signal; and a multimedia signal codec configured to encode and decode audio and video signals.

20. An electronic device, including: an image sensor configured to capture image and/or video data; and the chip according to any one of items 16 to 19, the chip being configured to use a deep neural network to process the captured image and/or video data for object recognition.

21. An electronic device, including: a processor; and a memory that stores a program, the program including instructions that, when executed by the processor, cause the electronic device to perform a method according to any one of items 1 to 15.

22. A non-transitory computer-readable storage medium that stores a program, the program including instructions that, when executed by a processor, cause the processor to perform a method according to any one of items 1 to 15.

Although the embodiments or examples of the present disclosure have been described with reference to the drawings, it should be understood that the methods, chips and devices described above are merely example embodiments or examples, and the scope of the present disclosure is not limited by the embodiments or examples, and is only defined by the scope of the granted claims and the equivalents thereof. Various elements in the embodiments or examples may be omitted or substituted by equivalent elements thereof. Moreover, the steps may be performed in an order different from that described in the present disclosure. Further, various elements in the embodiments or examples may be combined in various ways. It is important that, as the technology evolves, many elements described herein may be replaced with equivalent elements that appear after the present disclosure.

The various embodiments described above can be combined to provide further embodiments. Aspects of the embodiments can be modified to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A compression method for a deep neural network, the deep neural network including a plurality of layers, wherein the plurality of layers comprises an input layer and at least one non-input layer, and wherein the method comprises, for a first layer of the at least one non-input layer:
   acquiring parameters of the first layer from a parameter storage space;
   acquiring a first feature map from a feature map storage space, wherein the first feature map is a computation result from a second layer, and wherein the second layer is an immediate previous layer of the first layer;
   generating a second feature map based on the acquired parameters of the first layer and the first feature map;
   compressing the second feature map to obtain a compressed second feature map; and
   storing the compressed second feature map in the feature map storage space.

2. The method according to claim 1, wherein the compressing the second feature map includes performing a lossy compression on the second feature map.

3. The method according to claim 1, wherein the method is used in a forward propagation phase in a training process of the deep neural network and an inference process of the deep neural network.

4. The method according to claim 1, wherein the deep neural network comprises a convolutional neural network, and the convolutional neural network comprises a plurality of convolutional layers, and wherein the method is performed for at least one of the plurality of convolutional layers.

5. The method according to claim 1,
   wherein the first feature map is a compressed feature map, and
   wherein the generating the second feature map based on the acquired parameters and the first feature map comprises:
      decompressing the first feature map; and
      generating the second feature map based on the acquired parameters and the decompressed first feature map.

6. The method according to claim 1,
   wherein the parameters acquired from the parameter storage space are compressed parameters, and
   wherein the generating the second feature map based on the read parameters and the first feature map comprises:
      decompressing the acquired parameters; and
      generating the second feature map based on the decompressed parameters and the first feature map.

7. The method according to claim 2, wherein the compressing the second feature map comprises:
   transforming the second feature map from a spatial domain into a frequency domain to obtain a transform coefficient; and
   quantizing the transform coefficient.

8. The method according to claim 2, wherein the compressing the second feature map further comprises: performing predictive coding on the second feature map, wherein the predictive coding includes at least one of intra prediction or inter prediction.

9. The method according to claim 2, wherein the compressing the second feature map comprises: compressing different regions of the second feature map in different compression ratios, wherein a compression ratio of a region of the regions depends on a degree of interest in the region, and wherein a compression ratio of a region of a first degree of interest is less than a compression ratio of a region of a second degree of interest, the first degree of interest being higher than the second degree of interest.

10. The method according to claim 2, wherein the compressing the second feature map comprises: performing non-uniform quantization on the second feature map, wherein a first region of the regions of the second feature map has a different quantization step from a second region of the regions of the second feature map.

11. The method according to claim 10, wherein a quantization step of a region of the regions of the second feature map is determined based on at least one of the following:
   image complexity of the region;
   a position of the region in the second feature map;
   an importance degree of the region;
   presence or absence of a target feature in the region; and
   a number of the target feature in the region.

12. The method according to claim 11, wherein the target feature comprises a feature of interest in an application scenario of the deep neural network.

13. The method according to claim 11, wherein the determining the quantization step of a region of the regions according to the presence or absence of the target feature in the region comprises:
   in response to the presence of the target feature in the region, assigning a first quantization step to the region; and
   in response to the absence of the target feature in the region, assigning a second quantization step to the region,
   wherein the first quantization step is smaller in size than the second quantization step.

14. The method according to claim 11, wherein the determining the quantization step of a region of the regions according to the number of the target feature in the region comprises:
- in response to the number of the target feature in the region being greater than a threshold, assigning a third quantization step to the region; and
- in response to the number of the specific features in the region being less than or equal to the threshold, assigning a fourth quantization step to the region,
- wherein the third quantization step is smaller in size than the fourth quantization step.

15. The method according to claim 1, wherein the deep neural network is configured for processing one or more of image or video data for object recognition.

16. A An electronic device, comprising:
- one or more processors;
- a memory storing one or more programs, wherein the one or more processors are configured to execute the one or more programs to perform following operations for a first layer of at least one non-input layer in a plurality of layers of a deep neural network;
- acquiring parameters of the first layer from the parameter storage space;
- acquiring a first feature map from the feature map storage space, wherein the first feature map is a computation result from a second layer, and wherein the second layer is an immediate previous layer of the first layer;
- generating a second feature map based on the acquired parameters of the first layer and the first feature map;
- compressing the second feature map to obtain a compressed second feature map; and
- storing the compressed second feature in the feature map storage space.

17. The device according to claim 16, wherein the device comprises an artificial intelligence vision chip.

18. The device according to claim 16, wherein the device further comprises:
- an image signal processing (ISP) unit configured to process an image signal; and
- a multimedia signal codec configured to encode and decode audio and video signals.

19. A non-transitory computer-readable storage medium that stores a program, the program comprising instructions that, when executed by a processor, cause the processor to perform following operations for a first layer of at least one non-input layer in a plurality of layers of a deep neural network:
- acquiring parameters of the first layer from the parameter storage space;
- acquiring a first feature map from the feature map storage space, wherein the first feature map is a computation result from a second layer, and wherein the second layer is an immediate previous layer of the first layer;
- generating a second feature map based on the acquired parameters of the first layer and the first feature map;
- compressing the second feature map to obtain a compressed second feature map; and
- storing the compressed second feature map in the feature map storage space.

20. The non-transitory computer-readable storage medium according to claim 19, wherein the compression performed on the second feature map comprises lossy compression.

* * * * *

UNITED STATES PATENT AND TRADEMARK OFFICE
CERTIFICATE OF CORRECTION

PATENT NO. : 11,272,188 B2
APPLICATION NO. : 17/191606
DATED : March 8, 2022
INVENTOR(S) : Ji Zhou et al.

It is certified that error appears in the above-identified patent and that said Letters Patent is hereby corrected as shown below:

In the Claims

Column 19, Claim 16, Line 16:
"A An electronic device,"
Should read:
--An electronic device,--.

Column 20, Claim 16, Line 1:
"compressed second feature in the feature map"
Should read:
--compressed second feature map in the feature map--.

Signed and Sealed this
Second Day of April, 2024

Katherine Kelly Vidal
*Director of the United States Patent and Trademark Office*